(12) United States Patent
Nieminen

(10) Patent No.: US 7,173,091 B2
(45) Date of Patent: *Feb. 6, 2007

(54) POLYMER BLEND

(75) Inventor: Jyri Nieminen, Tampere (FI)

(73) Assignee: Ionphase Oy, Tampere (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/479,211

(22) PCT Filed: Jun. 25, 2002

(86) PCT No.: PCT/FI02/00559

§ 371 (c)(1),
(2), (4) Date: Apr. 22, 2004

(87) PCT Pub. No.: WO03/000789

PCT Pub. Date: Jan. 3, 2003

(65) Prior Publication Data

US 2004/0171752 A1   Sep. 2, 2004

(30) Foreign Application Priority Data

Jun. 26, 2001  (FI) .................................. 20011360

(51) Int. Cl.
- C08L 33/02 (2006.01)
- C08L 71/02 (2006.01)
- H01B 1/12 (2006.01)

(52) U.S. Cl. .................. 525/92 A; 525/173; 525/176; 525/183; 252/519.21

(58) Field of Classification Search .................. None
See application file for complete search history.

(56) References Cited

U.S. PATENT DOCUMENTS 3,763,109 A * 10/1973 Witsiepe .................. 528/301
4,010,222 A * 3/1977 Shih .......................... 525/176
4,187,358 A * 2/1980 Kyo et al. ................. 525/132
5,994,470 A * 11/1999 Tanaka et al. ............. 525/183
6,124,389 A * 9/2000 Cavallaro et al. .......... 524/432
6,613,843 B2 * 9/2003 Takesue et al. ............ 525/221
2004/0166347 A1 * 8/2004 Nieminen ................... 428/500

FOREIGN PATENT DOCUMENTS

| DE | 3242827 | 7/1983 |
|----|---------|--------|
| EP | 0613 919 | 9/1994 |
| EP | 0915506 | 5/1999 |
| GB | 2112789 | 7/1983 |
| JP | 10231401 | * 9/1998 |
| WO | WO 9933918 | 7/1999 |
| WO | WO 01/14471 | 3/2001 |

OTHER PUBLICATIONS

Database WPI, Week 199629, Derwent Publications Ltd., London, GB; AN 1996-28364 & JP 8120147 A(Sanyo Chem Ind Ltd), May 14, 1996 Abstract.

* cited by examiner

Primary Examiner—David J. Buttner
(74) Attorney, Agent, or Firm—Harness, Dickey & Pierce, P.L.C.

(57) ABSTRACT

The invention relates to a polymer blend and a process for its preparation. The polymer blend contains A) a polymer of an olefin and an unsaturated carboxylic acid, wherein the amount of acid groups is 0.5–15 molar %, and B) a polyether block polymer made up of a polyether block and a polyamide or polyester block, the acid groups in polymer A and the polyether blocks in polymer B having at least partly coordinated alkali ions, and an alkali metal being present in an amount of approx. 0.02–3 millimols/gram of the polymer blend. The blend according to the invention has a good electrical conductivity and excellent mechanical properties.

20 Claims, No Drawings

POLYMER BLEND

The present invention relates to a polymer blend that is electrically conductive but, nevertheless, has the typical strengths of plastics.

With increased use of electronics industry products the prevention of electrostatic charges and their controlled discharge have become increasingly important, since it has been estimated that ESD (electrostatic discharge) annually causes losses of over 25 billion U.S. dollars to the electronics manufacturing industry alone.

Electrically conductive plastics used to be produced by adding to them finely divided carbon black or carbon fibers. One of the important factors hindering the use of composites of polymers and conductive particles is the extraction of conductive particles from the material. This, for example, prevents the use of materials containing carbon black in clean rooms. Percolation, i.e. an extensive change in the conductivity of a material with a small increase of the amount of conductive particles, causes problems when it is desired to set the electrical conductivity of the material at a certain level. This causes difficulties in particular in ESD shielding. Attempts have also been made to render plastics electrically conductive by the use of antistatic materials, i.e. materials that absorb moisture. The problems with these materials include migration, high sensitivity of conductivity to relative humidity, and instability both during processing and in the products themselves.

In the subsequent phase there were manufactured electrically conductive polymers, which were, for example, polyanilines. Known electrically conductive polymers have, owing to their structure, poor mechanical properties, and additionally they are unstable under many chemical exposures.

Polyelectrolytes represent a different kind of electrically conductive polymers. Electrical conductivity of movable ions is typical of them. Generally both anionic and cationic carriers of charge are used. The polymer frame used consists of, for example, polyethers. A number of patents have been published in this topic area; in them, electrical conductivity has been produced by the addition of a lithium salt, e.g. $LiClO_4$, to the polymer. Disadvantages typical of polyelectrolytes include poor mechanical properties and poor resistance to chemicals. Furthermore, the anions and cations become extracted from the materials, which limits their use. Lithium ions becoming extracted causes problems in food packaging applications.

EP application publication 0 915 506 A1, Tejin Ltd, discloses how there is produced from polyester and polyether ester amide, with an alkali metal addition of 10–2500 ppm, an electrically conductive polymer blend which additionally has 0–40% by weight of polyolefins modified with epoxy groups. The publication mentions specifically that there remain no more than 1% of free carboxyl acid groups. The publication contains no mention of how the alkali metals or alkali earth metals are introduced into the polymer or whether they are mono- or bivalent or mixtures thereof.

EP application publication 0 613 919 A1 (U.S. Pat. No. 5,652,326), Sanyo, further describes how an electrically conductive plastic is obtained from polyether ester amide and alkali metals when 0.01–2.00% by mass of an alkali metal halide or alkali earth halide is introduced into the mixture. No difference is made between monovalent and bivalent ions with respect to electrical conductivity. According to a known option, the sulfonic groups grafted to it bind the alkali cations. The specification describes carboxyl acid groups, but in the examples they are always esterified. According to the examples, the recommended amount of metal salt is up to 5–30% by mass of the material being prepared. Halogens cause problems in some embodiments.

DE application 32 42 827 A1, Ato Chimie, states that it is possible to produce from polyether ester amide and polyolefins an electrically conductive blend that is sufficiently strong and fulfils the antistatic requirements according to the so-called cigarette ash test. The publication does not contain a mention of the use of alkali ions or alkali earth ions, or of acid groups binding them.

JP application publication 58 015 554, Toray Industries, describes a heat-resistant blend of a polyether ester amide and an ionomer. It is mentioned in the publication that the ionomer is prepared by adding mono-, di- or trivalent metallic ions to alpha olefin and a polymer of beta-unsaturated carboxylic acid. The publication does not differentiate among the various cations, and no ions are added to the polymer present in the ether. There is no mention of the electrical conductivity of the blend.

In addition to the above, there are known many polymer blends, primarily fulfilling antistatic requirements, in which blends the electrical conductivity has been obtained by mixing into them polymers containing conjugated double bonds, $BF_4$, $FeCl_3$ or $LiClO$, or similar salts, or merely antistatic, water-binding substances the electrical conductivity of which varies according to the relative humidity of air.

There are additionally known a modifier containing, for example, bis(methyl)cyclopentane divinyl cobalt or its derivatives, which is added to the polymer blend in amounts of 8–15% and by means of which electrical conductivity is produced.

U.S. Pat. No. 6,140,405, B. F. Goodrich describes how, by the use of lithium trifluoromethane sulfonimide and a suitable solvent there is obtained a polymer suitably electrically conductive for ESD shielding.

According to U.S. Pat. No. 5,928,565, electrically conductive polymers are obtained by mixing organic sulfonic acids with polyaniline. However, such additives render the polymer blend quite dark, which limits their use.

In U.S. Pat. No. 6,149,840, in turn, it is stated that normal polymers can be rendered electrically conductive by mixing into them fluorosulfonated polyaniline in an amount of approx. 50% and by incorporating this into other polymers by means of a Lewis acid or organotitanate.

U.S. Pat. No. 5,369,179 describes an antistatic mixture of polyether amide and a suitable blending polymer, such as an ionomer. The ether block in the material according to the patent is not compounded ionically, and only a polyvalent ionomer is mentioned in the claims.

According to U.S. Pat. No. 5,179,168, Du Pont, a blend prepared from two different ionomers can be given antistatic properties by mixing large amounts of an alkali cation with an ionomer containing a large quantity of carboxylic acid groups. Absorption of water by the ionomer increases as the degree of neutralization increases, and a high degree of neutralization, for example, complicates processing.

The object of the present invention is to eliminate the disadvantages associated with the state of the art and to provide a completely novel electrically conductive polymer blend. It is a particular object of the invention to provide a substantially colorless and strong polymer blend which withstands processing well and the electrical conductivity of which is retained even in repeated melt processings and in a wide range of conditions of use.

The invention is based on the idea that the electrically conductive polymer blend comprises a blend of at least two polymers, the first polymer component of the blend comprising an ionomer and the second polymer component being a polyether block polymer. The ionomer is most preferably made up of a copolymer formed by an olefin, such as ethylene and/or propylene, and an unsaturated carboxylic acid, the copolymer being ionically crosslinked. The polyether block polymer is made up in particular of a polyether block and a polyamide or polyester block. According to the invention the acid groups in the ionomer are at least in part ionized with cations. Likewise, the polyether blocks in the block polymer are at least in part in the form of a salt. The cations cause crosslinking of ionomers and coordination of block polymers, and at the same time the strength of the polymer blend increases considerably as ion bonds form, and as alkali cations are coordinated with the ethers the electrical conductivity of the blend increases significantly. The ion bond according to the invention is also thermally reversible. In the polymer blend the number of acid groups in the ionomer is typically approx. 0.5–15 molar % of the ionomer.

The cations are preferably derived from alkali metals, preferable alkali metals including sodium, potassium, rubidium and cesium, and mixtures thereof. The alkali metal is present in an amount of approx. 0.02–3.0 millimols/gram of the polymer blend, preferably less than 2.5 millimols/gram of the polymer blend. With the stated amounts added, a high electrical conductivity and excellent mechanical properties are obtained simultaneously.

Blends according to the invention can be prepared by mixing together 90–10 parts by weight of a copolymer made up of an olefin and an unsaturated carboxylic acid, 10–90 parts by weight of a block polyether, and an alkali metal compound the amount of which corresponds to 0.02–3 millimols of the alkali metal ion/1 g of the polymer blend. The mixing is carried out at an elevated temperature, preferably in a molten state, and it is continued until the alkali metal compound has substantially completely reacted with the polymer components of the mixture, whereafter the polymer blend obtained can be processed to a polymer product, e.g. fiber or film.

More precisely, the polymer blend according to the invention is characterized in what is stated in the characterizing part of claim 1.

The process according to the invention for its part is characterized in what is stated in the characterizing part of claim 19.

The present invention provides considerable advantages. Thus, numerous good properties are combined in the polymer blend according to the invention. Its electrical conductivity is steady, and it does not contain migrating compounds such as softeners or antistatic agents. No soot-like percolation is present in the material when the polymer blend according to the invention is blended into other polymers to form an antistatic polymer. The material has high compatibility with numerous polymers and excellent mechanical properties.

The polymer blend prepared according to the method conducts electricity well, with optimal ESD shielding, is permeable to water vapor, and functions with a novel mechanism. The usability of the polymer blend according to the invention in a number of applications is good owing to its cationic conductivity.

The material according to the invention is an ionomer inside which there is built a solid polymer polyelectrolyte. In the invention, the good properties of solid polyelectrolytes are combined with the typical good properties of ionomers. Furthermore, the material does not contain extractable ions that cause problems by contaminating sensitive components. The alkali metal ions produce both a high electrical conductivity and excellent mechanical properties. The polymer blend is also free of halogens, and additionally it passes the cyto-toxicity, i.e. tissue-friendliness, test.

It is possible to use the material according to the invention in, for example, packaging materials, fibers, pipes, hoses, coating for wear surfaces, coating for numerous purposes, biotechnological applications, loudspeakers, and as an electrically conductive additive in numerous different polymers. It is especially advantageously suitable for the coating of packaging cartons for electronics products, floor coatings, and fiber applications. In these it is possible to exploit the good mechanical properties of the blend, and owing to these it is possible to form films having a thickness of approx. 10–500 micrometers, typically approx. 15–200 micrometers.

The invention is examined below with the help of a detailed description and a number of embodiment examples.

According to the present invention, the electrically conductive polymer is in one embodiment made up of at least two different polymers, of which one contains carboxylic acid groups and the other ether bonds, and at least one alkali metal cation. According to the invention at least some of the ether groups hold by means of a polar charge a monovalent cation, which is Li, Na, K, Cs or Rb, or a mixture thereof. The cation is highly preferably K. This and other cations (also the alkaline earth ions mentioned below) and similar compounds of bivalent cations can be introduced into the blend in the form of hydroxides, oxides, formiates, acetates or mixtures thereof. In the polymer blend, also some of the carboxylic acid groups are ionized.

Among, for example, the copolymer of ethylene and methacrylic acid (E/MAA) and the polyether block amide (PEBA) and the alkali metal cation it is possible to build a polymeric system wherein an IPN (InterPenetrated Network) structure of PEBA is formed inside the E/MAA phase. In the material, some of the cations crosslink the methacrylic acid groups in the E/MAA. Thus there are formed thermally reversible ion bonds that improve the mechanical properties of the polymer. Some of the cations bond to the oxygen pools of the polyether and produce, for example by means of segmental movement of the polymer chains, ionic electrical conductivity.

In the accompanying claims, the ionomer is called polymer A and the block polyether is called polymer B. Polymers A and B are present in the mixture at weight ratios A/B 90/10–10/90, preferably 85/15–20/80. The alkali metal content of the polymer blend is 0.02–3.0 millimols/gram of the polymer blend, typically less than 2.5 millimols/gram of the polymer blend, in particular approx. 0.1–1.7 millimols/gram of the polymer blend.

Ionomers are known for, for example, their brightness and good mechanical properties. Generally ionomers are copolymers of alpha- or beta-unsaturated carboxylic acid and ethylene and are partly crosslinked with I- or II-valent cations. Ethylene ionomers are typically good insulators, and their surface resistances are of the order of $10^{16}$–$10^{18}$ ohm (10 exp16–10 exp18). The good mechanical properties of ionomers enable the material to be used, for example, in packaging materials, floorings, as a blending polymer for other polymers, or as a coating.

According to the invention, the ionomer component of the polymer blend can be prepared, for example, from copolymers or terpolymers of ethylene and alpha- or beta-unsaturated carboxylic acids, the copolymers containing, in addition to the above-mentioned mers, esters of alpha- or beta-unsaturated carboxylic acids. The carboxylic acid in general has 3–8 carbon atoms. Typically the polymers have, in parts by mass, acrylic or methacrylic acid 4–24 parts, methyl-, ethyl, or butylacrulate or vinyl acetate 0–40 parts, the balance being ethylene in 100 parts of the polymer. Commercially available co- and terpolymers according to the invention include Du Pont's Nucrel, Bynel and Surlyn or Exxon Chemicals's Iotek-named ionomers and their non-neutralized precursors.

The polyether block may be located in the copolymer of the polyamide or polyester. The polyether block may be composed of polyethylene or polypropylene glycols (polyethylene oxide or polypropylene oxide), copolymers/blend polymers of these, poly(1,2-butyl glycol), or poly(tetramethyl glycol). Typically the mass proportion of polyether in the copolymer is 20–90 parts of 100 parts. Most preferably it is 50–90 parts of 100 parts. A low ether concentration weakens electrical conductivity. Commercially available polymers that contain a polyether block include Hytrel (Du Pont) and Pebax (Atofina). The surface resistances of these polymers range from $3^8$ to $4^{13}$ ohm.

An example of a preferable polyether block of the B-polymer is polyethylene oxide having a molecular weight within the range 300–20,000.

It has been observed in connection with the invention that electrical conductivity is produced with a mere monovalent cation, but when the polymer blend is reprocessed, its electrical conductivity unexpectedly drops, whereas according to our observations the said drop in conductivity does not occur when also a bivalent cation has been added to the blend. In this case the A-polymer is at least partly neutralized with a bivalent metal ion, which is, for example, Mg, Ca, Zn, Cu, Fe, Ba, Mn, or a mixture thereof. This is possibly explained by the monovalent cations transferring during repeated processing (in an extruder, in a molten state) to an increasing extent to neutralize the carboxylic acid groups, which does not occur when the carboxylic acid groups have been at least in part neutralized with a bivalent cation. The bivalent cation additionally increases the strength of the polymer blend. The polyether block at least partly coordinates or complexes the alkali metal added to the blend. The molar ratio of the monovalent to the bivalent metal ions is typically approx. 0.9–0.05.

The melt index of the polymer blend according to the invention, measured at a temperature of 190° C. and with a weight of 2160 g, is 0.01–500 g/10 min. The melt index varies strongly, depending on the degree of neutralization of the ionomer component and the cation used. The surface resistance (ASTM D-257) of the polymer blend is as low as $10^8$ ohm or lower. The water absorption of the polymer blend is typically less than 10% by mass/24 hours in immersion, and it fulfills the requirements of the cytotoxicity test.

According to one embodiment of the invention, the present composition contains as a blend at least two different polymers, of which the first a) has at least ether bonds and/or hydroxyl groups and/or keto groups, and of which the second b) contains at least carboxylic acid groups. The blend also contains monovalent cations, the purpose of which is to become gelatinized by the neutralization of the carboxylic acid and between the ether bonds or/and the ketone group or/and the negative pool of the hydroxide group. The product in this case contains both monovalent cations for the control of the electrical conductivity of the polymer and bivalent cations for the control of the strength properties, in which case there are monovalent cations in a quantity of 20–120%, typically 50–120%, of the equivalent amount per carboxylic acid groups in the polymer, and that the molar ratio of monovalent to bivalent cations is within the range 0.9–0.05, preferably 0.9–0.5. It is made up of at least two different polymers, of which the first a) is a polyether block amide having polyethylene glycol ether as the repeating segment, and the second b) is a polyethylene polymer grafted with at least one repeating segment having a carboxylic acid group, and of monovalent cations and bivalent cations.

The process according to the invention for preparing an electrically conductive polymer composition comprises first the mixing together, at an elevated temperature, of 90–10 parts by weight of a copolymer made up of an olefin and an unsaturated carboxylic acid, 10–90 parts by weight of a block polyether, and an alkali metal compound the amount of which corresponds to 0.02–3.0 millimols of alkali metal ions/1 g of the polymer blend. The blend is mixed at an elevated temperature in order to cause the alkali metal compound to react with the polymer components of the blend, and the mixing is continued until the alkali metal compound has substantially completely reacted with the polymer components of the mixture. As is evident from Example 12, the reaction can be deemed to have progressed to completion when there remain in the polymer no alkali compound residues which would dissolve in water. Typically in this case at least 90% by mass, in particular at least 95% by mass, of the alkali metal compound added has reacted.

According to a preferred embodiment, the polymer blend is mixed at a temperature of approx. 120–260° C. Most preferably the mixing is carried out in an extruder, and after the reaction the blend is processed by melt processing to a polymer product.

The materials of the examples were prepared in a twin-screw extruder at temperatures of 200–250° C., using a rotation speed of 50–100 r/min.

EXAMPLE 1

Outside the Invention

Polymer A, a terpolymer of ethylene (E), ethylacrylate (EA) and methacrylic acid (MAA) (80 parts of E, 10 parts of EA), and polymer B, a polyether block amide made up of approx. 50/50 parts of polyethylene glycol/polyamide-12, were mixed together at a ratio of 50 parts of PEBA and 50 parts of E/EA/MAA in a twin-screw extruder at a temperature of 220° C. The surface resistance measured (ASTMD-257) from a film extruded from the homogeneous blend at 30% RH was $10^{11}$ ohm (i.e. 10 exp11 ohm).

EXAMPLE 2

Outside the Invention

Along with the polymer blend according to Example 1 there was used in the extruder at 240° C. magnesium(II) 0.43 mmol/1 g of the polymer blend; the cation donor used was Mg(OH)$_2$. Water was released in the neutralization reaction in the extruder. And the surface resistance measured from the film extruded from the homonegeous blend at 30% RH was $10^{11}$ ohm.

EXAMPLE 3

The cation content of the blend 0.43 mmol/1 g of the polymer blend according to Example 2 came from lithium.

The cation source used was LiOH. The extrusion was carried out in accordance with Example 2. The surface resistance measured from the extruded film was $1 \times 10^9$ ohm.

EXAMPLE 4

The cation content of the blend 0.43 mmol/1 g of the polymer blend according to Example 2 came from sodium. The cation source used was NaOH. The extrusion was carried out in accordance with Example 2. The surface resistance measured from the extruded film was $2 \times 10^{10}$ ohm.

EXAMPLE 5

The cation in the blend according to Example 2 was potassium; the cation source used was KOH. The extrusion was carried out in accordance with Example 2. The surface resistance measured from the extruded sample was $7 \times 10^7$ ohm.

EXAMPLE 6

The ratio of the polymer blends of Example 5 was 60/40 E/EA/MAA to PEBA. The cation and its concentration were the same. The extrusion was carried out in accordance with Example 2. The surface resistance measured from the extruded sample was $2 \times 10^8$ ohm.

EXAMPLE 7

The ratio of the polymer blends of Example 5 was 70/30 E/EA/MAA to PEBA. The cation and its concentration were the same. The surface resistance measured from the extruded sample was $8 \times 10^8$ ohm.

EXAMPLE 8

The E/EA/MAA of Example 5 was replaced with E/MAA containing 88 parts of E and 12 parts of MAA. The cation in the blend was potassium and its concentration was 0.43 mmol/1 g of the polymer blend, the cation source used was KOH. The surface resistance measured from the extruded sample was $6 \times 10^7$ ohm.

EXAMPLE 9

The E/EA/MAA of Example 5 was replaced with E/BA/MAA (BA=butyl acrylate) containing 66 parts of E, 24 parts of BA and 10 parts of MAA. The cation in the blend was potassium and its concentration was 0.43 mmol/1 g of the polymer blend, the cation source used was KOH. The surface resistance measured from the extruded sample was $5 \times 10^7$ ohm.

EXAMPLE 10

The potassium ion concentration in the polymer blend according to Example 5 was 1.7 mmol/1 g of the polymer blend; the cation source used was KOH. The surface resistance measured from the extruded sample was $3 \times 10^7$ ohm.

EXAMPLE 11

The PEBA in the blend according to Example 5 was replaced with a corresponding PEBA containing 40 parts of PE and 60 parts of PA. The surface resistance measured for the PEBA used was $3 \times 10^9$ ohm. The surface resistance measured from the sample extruded from the polymer blend was $2 \times 10^9$ ohm.

EXAMPLE 12

The ion concentration in the polymer blend according to Example 5 was 0.7 mmol/1 g of the polymer blend. The magnesium/potassium ratio in the blend was 1/3, the cation source used was $Mg(OH)_2$ and KOH. The surface resistance measured from the extruded sample was $4 \times 10^7$ ohm.

Surface resistance values of up to $<10^7$ ohm have been achieved in tests using cesium ions. However, the high price of this cation limits its use.

On the basis of our test results it seems that, as the radius of the alkali metal ion used increases, the surface resistance of the polymer blend decreases, with the exception of the lithium ion. This can be explained by an increase of the radius/charge ratio of the ion, which reduces the forces of attraction between the ion and the ether pool and thereby increases the mobility of the ion. However, an increase in the physical size of the ion limits mobility. Tests carried out with rubidium ions support this conception.

A sample according to Example 12 was soaked as a sheet 0.5 mm thick for 1 hour in ion-exchanged water at 85° C., and no K or Mg was found analytically in the water. On the other hand, organic compounds were found when a 1.6 µg/cm$^2$ sample was analyzed using gas chromatography. This may be explainable by evaporation of monomers of the polymers.

A composite having 50% by mass of inert glass balls as filler was prepared from each of the above samples. After extrusion of four minutes (240° C.), the resistance of all but Example 12 had clearly increased. A bivalent cation seems to stabilize the electrical conductivity of the blend in connection with melt processing.

The polymer blend according to Example 12 passes the cytotoxicity test; method (ref. H. Larjava, J. Heino, T. Krusius, E. Vuorio and M. Tammi, 1998, Biochem. J., 256 (1988) 35). The cytotoxicity testing was carried out using an animal cell culture in which the amount of lactate dehydrogenase (LDH) released by the cells is measured by activity measurement.

The result means that the material is tissue-friendly and has numerous uses in the field of biomaterials technology.

The bivalent cations used in the tests included Zn, Ca, Fe(II) and Sn(II). On the basis of the tests all of them had strength-increasing and conductivity-stabilizing properties in further processing. The color of some cations limits their use.

In the research leading to the present invention it was observed, among other things, that electrical conductivity is produced by monovalent cations, and that bivalent cations stabilize conductivity during further processing and reduce the absorption of water by the blend. There are significant differences in electrical conductivity among monovalent cations. Good electrical conductivity is achieved with an ion concentration sufficiently low from the viewpoint of processing. Trivalent cations have such an effect that the product will be thermoset-like.

The electrical conductivity of the polymer blend according to the invention can be improved further, for example, with commercial antistatic compounds, softeners or other small-molecular hygroscopic compounds.

Very complete neutralization of the carboxylic acid groups results in a product difficult to process; the product is electrically conductive even without a bivalent cation but in that case some of its other properties suffer.

The products according to the examples presented above, containing Mg as the bivalent cation, were resilient and did not tend to stretch permanently as would a PE film of a corresponding thickness. This illustrates the elastomer-like behavior of ionomers. The products are not completely bright in the manner of ionomer films, but their transparency is good.

The invention claimed is:

1. An electrically conductive polymer blend, comprising
   A. a polymer of an olefin and an alpha-or beta-unsaturated carboxylic acid having 3–8 carbon atoms, wherein the quantity of acid groups is 0.5–15 molar %, and
   B. a block polyether polymer made up of a polyether block of polyethylene oxide,
   potassium present in an amount of approx. 0.02–3 millimols/one gram of the polymer blend,
   the acid groups of polymer A having at least partly coordinated ions of said potassium, and the block polymer B having at least partly coordinated or complexed ions said of potassium.

2. The polymer blend according to claim 1, wherein the potassium content is within the range 0.1–1.7 millimols/gram of the polymer blend.

3. The polymer blend according to claim 1, wherein the olefin in polymer A is ethylene or propylene.

4. The polymer blend according to claim 1, wherein the potassium is present at maximum in an amount of approx. 2.5 millimols/gram of the polymer blend.

5. The polymer blend according to claim 1, wherein polymers A and B are present in the blend in parts by weight A/B 90/10–10/90.

6. The polymer blend according to claim 5, wherein polymers A and B are present in the blend in parts by weight A/B 85/15–20/80.

7. The polymer blend according to claim 1, wherein in polymer B the polyether block is polyethylene oxide having a molecular weight within the range 300–20,000.

8. The polymer blend according to claim 1, wherein in polymer B the proportion of polyether is 90–30% of the entire weight of polymer B.

9. The polymer blend according to claim 1, wherein polymer A is at least partly neutralized by a bivalent metal ion, which is Mg, Ca, Zn, Cu, Fe, Ba, Mn, or a mixture thereof.

10. The polymer blend according to claim 9, wherein the molar ratio of a monovalent to the bivalent metal ions is 0.9–0.05.

11. The polymer blend according to claim 1, wherein the melt index, measured at a temperature of 190° C. and with a weight of 2160 g, is 0.01–500 g/10 mm.

12. The polymer blend according to claim 1, wherein the surface resistance (ASTM D-257) of the polymer blend is less than $10^8$ ohm.

13. The polymer blend according to claim 1, wherein the water absorption of the polymer blend is less than 10% by mass/24-h immersion.

14. The polymer blend according to claim 1, wherein the polymer blend passes the cytotoxicity test.

15. The polymer blend according to claim 1, wherein potassium ions are added as hydroxides, oxides, formiates, acetates, or mixtures thereof.

16. A process for preparing an electrically conductive polymer composition, wherein there are mixed together at an elevated temperature
   90–10 parts by weight of a copolymer made up of an olefin and an unsaturated carboxylic acid,
   10–90 parts by weight of a block polyether of polyethylene oxide,
   and potassium, the amount of which corresponds to 0.02–3 millimols of the potassium ion/1 gram of the polymer blend.

17. The process according to claim 16, wherein
   a blend is formed that contains a copolymer made up of ethylene and an unsaturated carboxylic acid, a block polyether polymer made up of a polyamide or polyester block, and potassium,
   the blend is mixed at an elevated temperature in order to cause the potassium to react with the polymer components of the blend, and
   mixing is continued until the alkali metal compound has substantially completely reacted with the polymer components of the blend.

18. The process according to claim 16, wherein the blend is mixed at a temperature of 120–280° C.

19. The process according to any of claim 16, wherein the mixing is carried out in an extruder, and after the reaction the blend is processed by melt processing to a polymer product.

20. The process according to claim 19, wherein what is produced is polymer fibers or films.

* * * * *